(12) United States Patent
Jung et al.

(10) Patent No.: US 8,139,539 B2
(45) Date of Patent: Mar. 20, 2012

(54) SYSTEM AND METHOD FOR HANDOFF USING HYBRID NETWORK

(75) Inventors: Jae-Dong Jung, Yongin-si (KR); Seong-Joon Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 11/474,377

(22) Filed: Jun. 26, 2006

(65) Prior Publication Data
US 2007/0025296 A1 Feb. 1, 2007

(30) Foreign Application Priority Data
Aug. 1, 2005 (KR) ........................ 10-2005-0070399

(51) Int. Cl.
H04W 4/00 (2009.01)
(52) U.S. Cl. .................... 370/331; 370/338; 455/436
(58) Field of Classification Search ............ 455/439; 370/245, 320, 328, 329, 331, 332, 335, 338, 370/908
See application file for complete search history.

(56) References Cited

U.S. PATENT DOCUMENTS

| 6,587,680 | B1 * | 7/2003 | Ala-Laurila et al. ......... 455/411 |
|---|---|---|---|
| 6,674,403 | B2 | 1/2004 | Gray et al. |
| 6,853,845 | B2 * | 2/2005 | Hsu et al. ..................... 455/449 |
| 7,376,098 | B2 * | 5/2008 | Loeffler et al. ............... 370/329 |
| 7,688,785 | B2 * | 3/2010 | Bachmann et al. ........... 370/331 |
| 2004/0023669 | A1 * | 2/2004 | Reddy ......................... 455/456.1 |
| 2004/0057408 | A1 * | 3/2004 | Gray ............................ 370/338 |
| 2004/0196806 | A1 | 10/2004 | Loeffler et al. |
| 2005/0107085 | A1 * | 5/2005 | Ozluturk ....................... 455/439 |
| 2006/0129607 | A1 * | 6/2006 | Sairo et al. ................... 707/200 |
| 2006/0227745 | A1 * | 10/2006 | Olvera-Hernandez et al. .......................... 370/331 |

FOREIGN PATENT DOCUMENTS
KR 10-2004-0100607 12/2004

OTHER PUBLICATIONS
Korean Office Action for Korean Patent Application No. 2005-0070399 issued on Nov. 7, 2006.
Second Office Action dated May 11, 2010 from the State Intellectual Property Office of the People's Republic of China.

* cited by examiner

Primary Examiner — Rafael Pérez-Gutiérrez
Assistant Examiner — German Viana Di Prisco
(74) Attorney, Agent, or Firm — H.C. Park & Associates, PLC

(57) ABSTRACT

In a system and method for handoff using a hybrid network, a wireless local area network (WLAN) terminal determines its own position information through communication with a code division multiple access (CDMA) base station and a global positioning system (GPS) satellite, and a cell mapping server obtains information about a WLAN cell where the WLAN terminal is currently located from the WLAN terminal position information, determines information about a cell to which the terminal is expected to be handed off from the current position of the WLAN terminal, and provides the cell information to the WLAN terminal. This allows handoff to be performed without scanning a destination access point, thereby significantly reducing WLAN handoff time.

21 Claims, 9 Drawing Sheets

FIG. 8

| CDMA CELL LIST | AP CELL LIST |
|---|---|
| A | 1,2,3,4,5,6,7,8,9,10,11,12 |
| B | 5,12,22,33,34,35,36,37,38,39,41 |
| AP CELL LIST | AP SUBCELL LIST |
| 1 | 1-1,1-2,1-3,1-4,1-5,1-6 |
| 2 | 2-1,2-2,2-3,2-4,2-5,2-6 |
| 3 | 3-1,3-2,3-3,3-4,3-5,3-6 |
| 4 | 4-1,4-2,4-3,4-4,4-5,4-6 |
| 5 | 5-1,5-2,5-3,5-4,5-5,5-6 |
| 6 | 6-1,6-2,6-3,6-4,6-5,6-6 |

| HANDOFF MAPPING | | |
|---|---|---|
| | OLD AP | NEW AP |
| 3 | 1 | 8-4 |
| | 2 | 5-5 |
| | 3 | 2-6 |
| | 4 | 1-1 |
| | 5 | 7-2 |
| | 6 | 6-3 |
| 1 | 1 | 3-4 |
| | 2 | 2-5 |
| | 6 | 7-3 |
| 2 | 1 | 5-4 |
| | 5 | 1-2 |
| | 6 | 3-3 |
| 5 | 4 | 2-1 |
| | 5 | 3-2 |
| | 6 | 8-3 |

SYSTEM AND METHOD FOR HANDOFF USING HYBRID NETWORK

CLAIM OF PRIORITY

This application makes reference to, incorporates the same herein, and claims all benefits accruing under 35 U.S.C. §119 from an application for SYSTEM AND METHOD FOR PERFORMING HANDOFFS USING HYBRID NETWORK earlier filed in the Korean Intellectual Property Office on 1 Aug. 2005 and there duly assigned Ser. No. 10-2005-0070399.

BACKGROUND OF THE INVENTION

1. Technical Field

The present invention relates to a wireless local area network (WLAN) and, more particularly, to a system and method for handoff using a hybrid network wherein a new access point is scanned in the handoff process of a mobile terminal so that the mobile terminal is connected to the WLAN.

2. Related Art

In recent years, the transmission rate of the wireless local area network (WLAN) has increased significantly. While a cellular network still has a throughput that is too low to provide multimedia service, the WLAN provides Internet access service at a rate of 54 Mbps. The WLAN is a competitive technique applicable to mobile communication environments because of its broad bandwidth and low cost features.

The WLAN includes a terminal desiring access to a network, and access points relaying the terminal. The access points are connected to a backbone network.

The terminal may be a battery-driven notebook computer or personal digital assistant (PDA), but is not necessarily limited to such devices.

To be sent to another network, an 802.11 network frame should be translated into another type of frame. The access point bridges the networks. The backbone network delivers frames to a destination of the access point. A representative backbone network is an Ethernet.

The terminal has a WLAN module for connection to the WLAN. The terminal is provided with data service via the WLAN access point. One access point serves only a limited area. If the terminal moves to a coverage area of another access point, handoff occurs. Connection of a terminal from one access point to another is called a handoff between access points (inter-AP handoff). This process is called re-association in the IEEE 802.11 standard. For handoff, the terminal has to scan a new access point, which consumes much time and causes service delay.

Such delay in scanning the access point must be solved for real-time multimedia service, such as voice-over-Internet protocol (VoIP).

The IEEE 802.11 standard for a WLAN defines WLAN handoff including scanning, authentication, and re-association processes.

When a terminal moves from one access point area to another, a mobile node scans all channels provided by several neighboring access points. The IEEE 802.11 standard introduced two scanning methods.

The first method is a passive scanning method. In this method, a mobile node successfully receives signals from all channels, and waits to receive a beacon message from a scanned access point. The mobile node then determines the access point. In this method, overhead is reduced but delay time is too long. To overcome such a drawback of the passive scanning method, the active scanning method was introduced.

When active scanning is used, a mobile node broadcasts a probe request to each channel, and waits to receive a response from the channel during a minimum channel time (MinChannelTime). The mobile node scans all channels, and receives all beacon messages or probe responses to connect to the most appropriate access point.

Subsequent to the scanning process, an authentication process is performed. The mobile node transmits an authentication request to the newly determined AP, and the new AP determines whether the mobile node has permission to access the network, and returns an authentication response to the mobile node.

In this respect, authentication is a process of recognizing the presence of a mobile node and approving the mobile node to utilize basic service provided by an access point. Since a wireless network cannot provide the same security that a wired network can, the wireless network needs an additional authentication routine for determining whether a user accessing a network has access permission.

Finally, a re-association process is performed. The re-association process is a process in which a mobile terminal terminates an association with a present AP, and associates with a new AP, and a re-association request is initialized by the mobile terminal. The new AP 110-1 transmits a handoff request to the old AP, and in response to the handoff request, the old AP provides a handoff response containing information needed for the re-association to the new AP. Operation between the old AP and the new AP is defined in Inter Access Point Protocol (IAPP). In response to the handoff response, the new AP sends a re-association response to the mobile node.

It is known that the above-mentioned scanning process is a primary cause of delay in the overall handoff process of the WLAN mobile node. A selective scanning method is used to reduce scanning time. However, the selective scanning method does not provide effective reduction of scanning time because the method involves a standby time for discovering an optimal channel, e.g., a minimum channel time (MinChanelTime) to a maximum channel time (MaxChannelTime).

Thus, there is need for a channel scanning method capable of significantly reducing delay time in the handoff process of a WLAN mobile terminal.

SUMMARY OF THE INVENTION

It is an object of the present invention to provide a system and method for handoff using a hybrid network, the system and method being capable of reducing a channel scanning time by using a code division multiple access (CDMA) network and a global positioning system (GPS) system in the handoff process of a wireless local area network (WLAN).

According to an aspect of the present invention, a system for handoff in a WLAN comprises: a WLAN terminal which determines its own position information through communication with a CDMA base station and a GPS satellite; and a cell mapping server for obtaining information about a WLAN cell where the terminal is currently located from the position information of the WLAN terminal, for determining information about a cell to which the terminal is expected to be handed off from the current position of the WLAN terminal, and for providing the cell information to the WLAN terminal.

The position information may include at least one of GPS coordinate information of the terminal and information about a CDMA base station where the terminal is located.

The information about the cell to which the terminal is expected to be handed off may include information about an access point which serves a WLAN cell to which the terminal is expected to move.

The WLAN terminal preferably comprises: a GPS receiving module for receiving coordinate information of the WLAN terminal from the GPS satellite; a CDMA module for receiving information about a CDMA cell accessed by the WLAN terminal from the CDMA base station; a storage unit for storing the information about the cell to which the terminal is expected to be handed off; and a controller for transmitting the coordinate information and the CDMA cell information to the cell mapping server, for receiving the information about the cell to which the terminal is expected to be handed off from the cell mapping server, and for storing the cell information in the storage unit. The WLAN terminal may further comprise a WLAN module for receiving the information about the cell to which the terminal is expected to be handed off from the controller, and for performing the handoff based on the cell information.

The cell mapping server preferably comprises: a cell mapping database for storing information about CDMA cells and WLAN cells mapped to the CDMA cells, and the information about a cell to which the terminal is expected to be handed off, which is mapped to a current WLAN cell of the terminal; and a controller for determining the information about the cell to which the terminal is expected to be handed off based on the position information of the WLAN terminal and the mapping information stored in the cell mapping database, and for providing the cell information to the WLAN terminal.

The controller preferably obtains information about a WLAN cell overlapping a CDMA cell where the WLAN terminal is located, compares the WLAN cell information to GPS position information of the WLAN cell to determine information about a WLAN sub-cell where the terminal is currently located, and determines the information about the cell to which the terminal is expected to be handed off, which is matched to the WLAN sub-cell.

The cell mapping database may store at least one of information about an overall structure of CDMA cells, information about an overall structure of WLAN cells, and GPS coordinate information of the WLAN cells and sub-cells.

The cell mapping server may further include a position information receiving module for receiving the position information from the WLAN terminal.

The WLAN terminal may perform handoff based on the information about the cell to which the terminal is expected to be handed off, which information is received from the cell mapping server, without scanning a destination access point.

The system preferably further comprises: a GPS satellite for transmitting GPS coordinate information to the WLAN terminal; and a CDMA base station system for transmitting CDMA cell information to the WLAN terminal.

According to another aspect of the present invention, a system for managing a CDMA network and a WLAN comprises: a cell mapping database for storing information about CDMA cells and WLAN cells mapped to the CDMA cells, and information about a cell to which a terminal is expected to be handed off, which is mapped to each WLAN cell; and a controller for determining the information about a cell to which the terminal is expected to be handed off based on terminal position information including GPS coordinate information of the terminal or information about a CDMA cell where the terminal is located, and the information stored in the cell mapping database, and for providing the cell information to the terminal. The system may further comprise a position information receiving module for receiving from the terminal the GPS coordinate information of the terminal or the information about a CDMA cell where the terminal is located.

The controller preferably obtains information about a WLAN cell overlapping the CDMA cell where the terminal is located, compares the WLAN cell information to GPS position information of the WLAN cell to determine information about a WLAN sub-cell where the terminal is currently located, and determines the information about the cell to which the terminal is expected to be handed off, which is matched to the WLAN sub-cell.

According to yet another aspect of the present invention, a method for handoff in a WLAN comprises the steps of: determining, by a WLAN terminal, position information of the WLAN terminal through communication with a CDMA base station and a GPS satellite; obtaining information about a WLAN cell where the WLAN terminal is currently located from the position information, and determining information about a cell to which the WLAN terminal is expected to be handed off from current position of the WLAN terminal; and providing the determined information about the cell to which a terminal is expected to be handed off to the WLAN terminal.

The method preferably further includes the steps of: storing the information about the cell to which the WLAN terminal is expected to be handed off, which is provided to the WLAN terminal; and performing handoff based on the stored information about the cell to which the terminal is expected to be handed off without scanning a destination access point.

The step of determining the information about the cell to which the terminal is expected to be handed off may include the step of determining the information about the cell to which the terminal is expected to be handed off, based on information about CDMA cells and mapped WLAN cells, information about the cell to which the terminal is expected to be handed off, which is mapped to each WLAN cell, and GPS coordinate information of the WLAN terminal or the information about a CDMA cell where the WLAN terminal is located.

The step of determining the information about the cell to which the terminal is expected to be handed off may include the steps of: retrieving information about a WLAN cell overlapping the CDMA cell where the terminal is located; determining information about a WLAN sub-cell where the terminal is currently located by comparing the retrieved WLAN cell information to the GPS coordinate information of the WLAN terminal; and determining information about a neighboring cell matched to the retrieved WLAN sub-cell where the terminal is currently located.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 8 illustrates the structure of a cell mapping database according to an exemplary embodiment of the present invention;

DETAILED DESCRIPTION OF THE INVENTION

The present invention will now be described more fully with reference to the accompanying drawings, in which exemplary embodiments of the invention are shown. This invention may, however, be embodied in different forms and should not be construed as being limited to the exemplary embodiments set forth herein. Rather, these exemplary embodiments are provided so that this disclosure will be thorough and complete, and will fully convey the concept of the invention to those skilled in the art.

Figure 1:
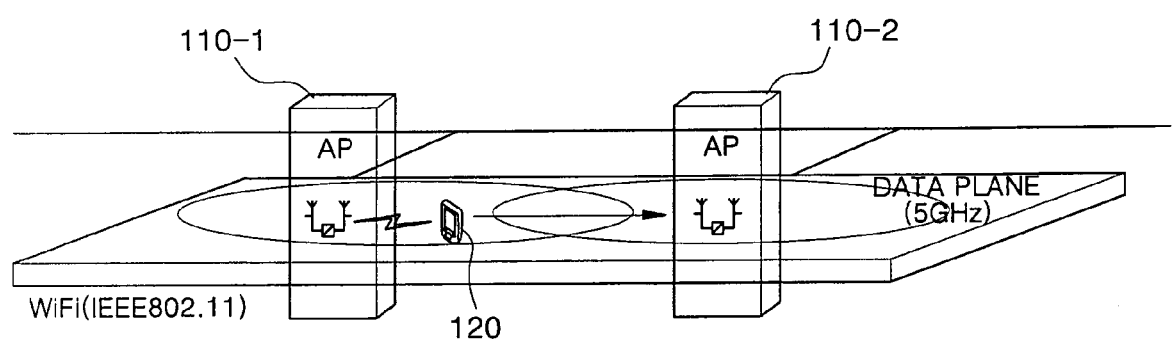
FIG. 1 illustrates the structure of a wireless local area network (WLAN)

FIG. 1 illustrates the structure of a wireless local area network (WLAN).

The WLAN includes a terminal (station or node) 120 desiring access to a network, and access points 110-1 and 110-2 relaying the terminal. The access points are connected to a backbone network.

The terminal 120 may be a battery-driven notebook computer or a personal digital assistant (PDA), but is not necessarily limited to such devices.

To be sent to another network, an 802.11 network frame has to be translated into another type of frame. The access point bridges the networks. The backbone network delivers frames to a destination of the access point. A representative backbone network is an Ethernet.

The terminal 120 has a WLAN module for connection to the WLAN. The terminal 120 is provided with data service via the WLAN access point 110-1. One access point serves only a limited area. If the terminal 120 moves to a coverage area of the other access point 110-2, handoff occurs. Connection of a terminal from one access point to another is called a handoff between access points (inter-AP handoff). This process is called re-association in the IEEE 802.11 standard. For handoff, the terminal should scan a new access point, which consumes much time and causes service delay.

Such delay in scanning the access point must be solved for real-time multimedia service, such as voice-over-Internet protocol (VoIP).

The IEEE 802.11 for a WLAN defines WLAN handoff including scanning, authentication, and re-association processes.

Figure 2:
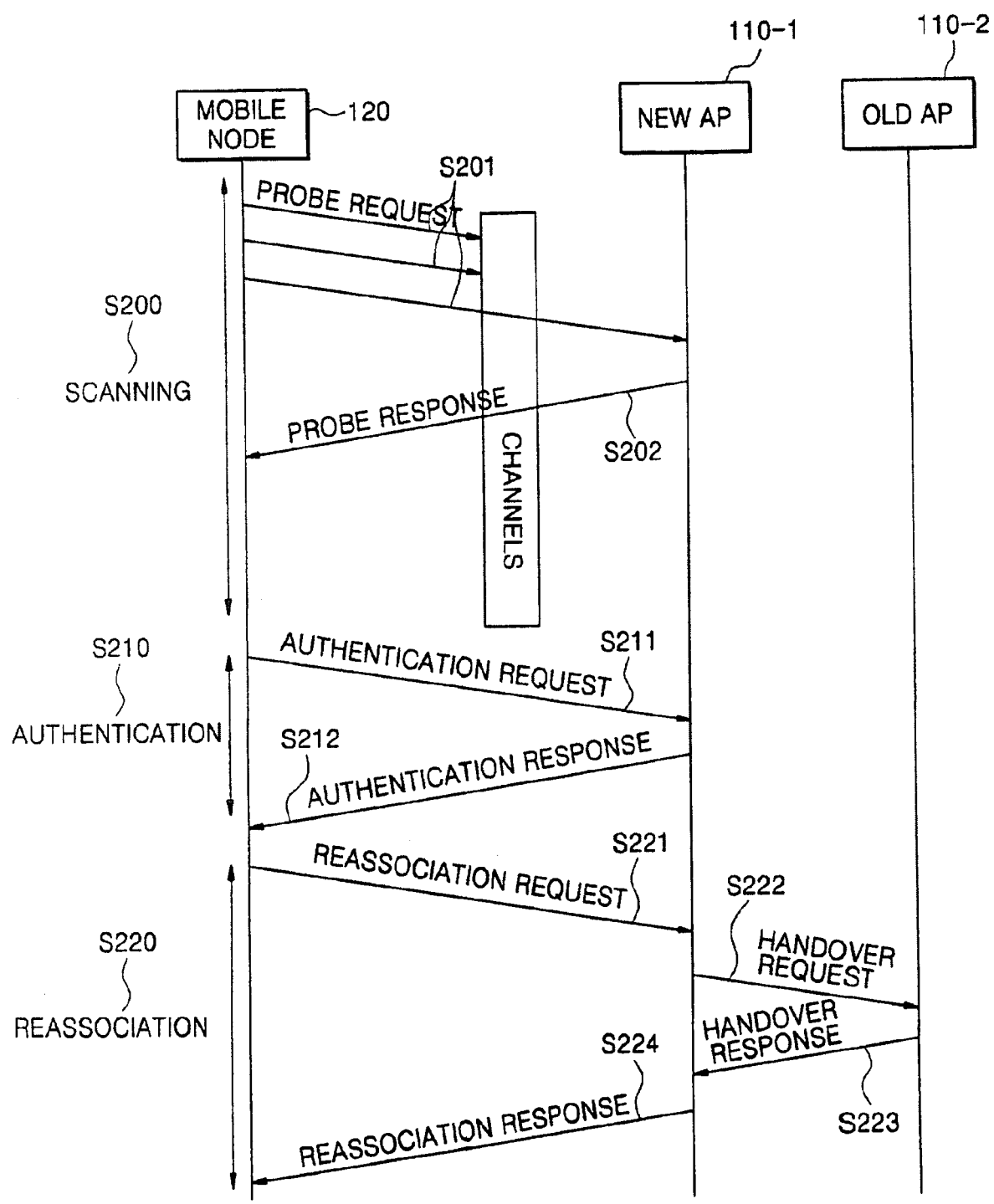
FIG. 2 illustrates a handoff process in a WLAN.

FIG. 2 illustrates a handoff process in a WLAN.

When a terminal moves from one access point area to another, a mobile node scans all channels provided by several neighboring access points (S200). IEEE 802.11 introduced two scanning methods.

The first method is a passive scanning method. In this method, a mobile node successfully receives signals from all channels and waits to receive a beacon message from a scanned access point. The mobile node then determines the access point. In this method, overhead is reduced but delay time is too long. To overcome such a drawback of the passive scanning method, the active scanning method was introduced. The active scanning method is used for the handoff process of FIG. 2.

When the active scanning is used, a mobile node broadcasts a probe request to each channel (S201), and waits to receive a response from the channel during a minimum channel time (MinChannelTime) (S202). The mobile node scans all channels and receives all beacon messages or probe responses to connect to the most appropriate access point.

Subsequent to the scanning process (S200), an authentication process (S210) is performed. The mobile node 120 transmits an authentication request to a newly determined AP 110-1 (S211) and the new AP 110-1 determines whether the mobile node 120 has permission to access the network, and returns an authentication response to the mobile node 120 (S212).

In this respect, authentication is a process of recognizing the presence of a mobile node and approving the mobile node to utilize basic service provided by an access point. Since a wireless network cannot provide the same security that a wired network can, the wireless network needs an additional authentication routine for determining whether a user accessing a network has access permission.

Finally, a re-association process (S220) is performed. The re-association process is a process in which a mobile terminal terminates an association with a present AP and associates with a new AP, and a re-association request is initialized by the mobile node 120 S221. The new AP 110-I transmits a handoff request to the old AP 110-2 (S222), and in response to the handoff request, the old AP 110-2 provides a handoff response containing information needed for the re-association to the new AP 110-1 (S223). Operation between the old AP and the new AP is defined in Inter Access Point Protocol (IAPP). In response to the handoff response, the new AP 110-1 sends a re-association response to the mobile node 120 (S224).

It is known that the above-mentioned scanning process is a primary cause of delay in the overall handoff process of the WLAN mobile node. A selective scanning method is used to reduce scanning time. However, the selective scanning method does not provide effective reduction of scanning time because the method involves a standby time for discovering an optimal channel, e.g., a minimum channel time (MinChanelTime) to a maximum channel time (MaxChannelTime).

Thus, there is need for a channel scanning method capable of significantly reducing delay time in a handoff process of a WLAN mobile terminal.

Figure 3:
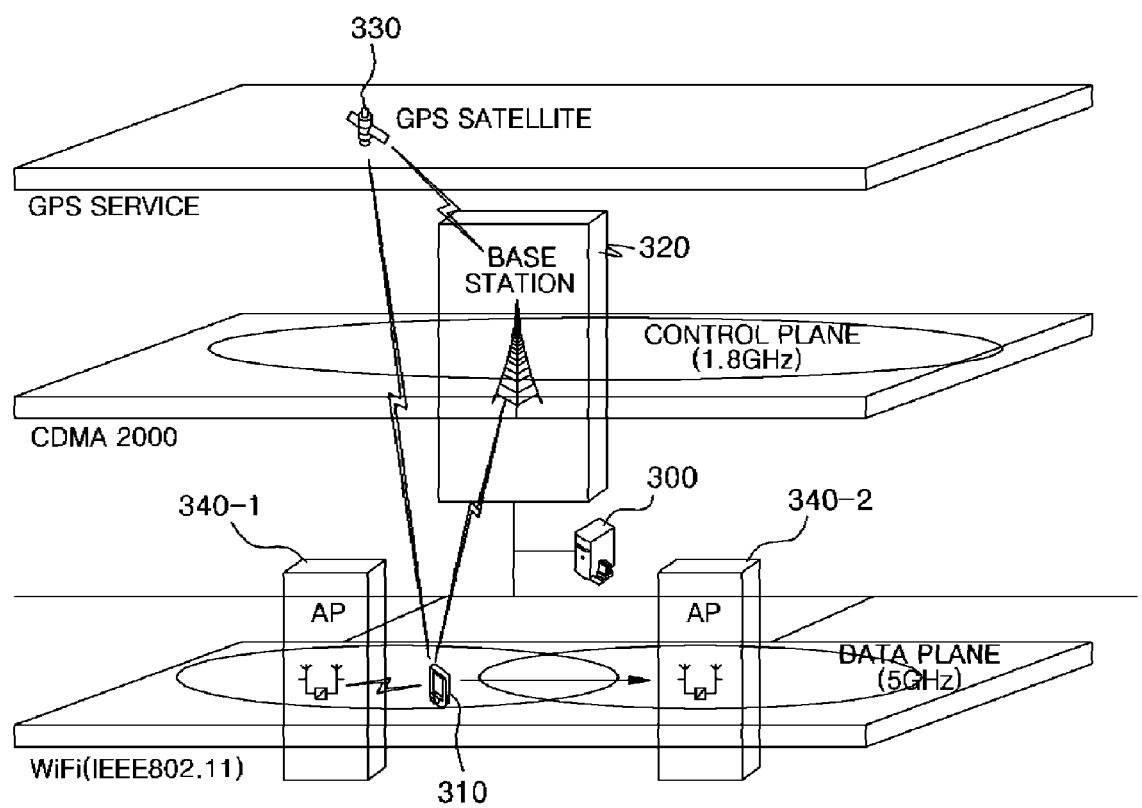
FIG. 3 illustrates the structure of a hybrid network according to an exemplary embodiment of the present invention.

FIG. 3 illustrates the structure of a hybrid network according to an exemplary embodiment of the present invention.

Referring to FIG. 3, the hybrid network comprises a CDMA2000 network and a GPS satellite, as well as a basic IEEE 802.11 WLAN.

The WLAN includes a terminal 310 and access points 340-1 and 340-2 relaying between the terminal and a backbone network. The CDMA2000 network includes a base station system. The base station system further includes a base station 320, a base station controller (not shown), a switch (not shown), etc. To provide a global positioning system (GPS), the GPS satellite 330 communicates with the base station 320 and the terminal 310.

According to an exemplary embodiment of the present invention, the terminal 310 communicates with the WLAN via the access points 340-1 and 340-2, and also communicates with the base station 320 of the CDMA2000 network in order to locate the terminal depending on the layout of cells in the CDMA2000 network. The base station 320 uses GPS-based cell synchronization to locate the terminal 310. The terminal 310 also communicates with the GPS satellite 330 in order to obtain position information containing coordinates of the terminal 310.

A cell mapping server 300 receives the terminal coordinates and information about the terminal position within the CDMA cell from the terminal 310, retrieves a WLAN cell matched to the received information so as to determine the cell to which the terminal 310 is expected to be handed off, and provides the information about the cell to which the terminal 310 is expected to be handed off to the terminal 310. Using the information about the cell to which the terminal 310 is expected to be handed off, the terminal 310 can perform handoff without scanning another channel.

Figure 4:
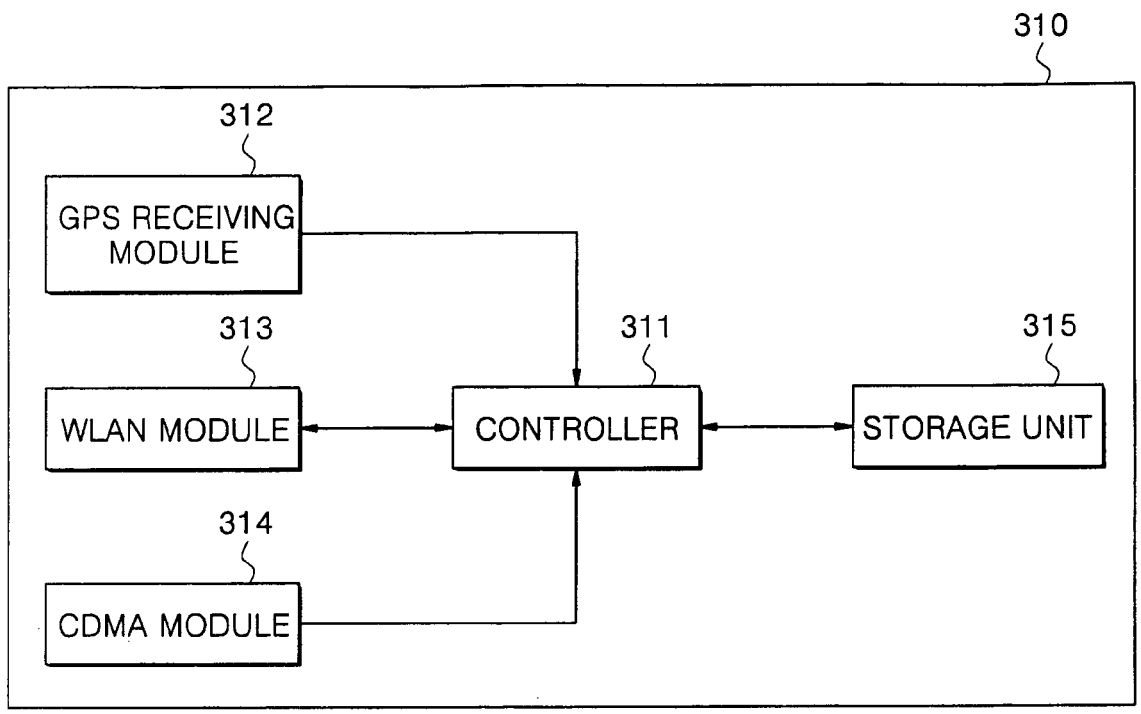
FIG. 4 is a block diagram of a terminal according to an exemplary embodiment of the present invention.

FIG. 4 is a block diagram of a terminal according to an exemplary embodiment of the present invention.

Referring to FIG. 4, the terminal 310 includes a GPS receiving module 312, a WLAN module 313, a CDMA module 314, a storage unit 315, and a controller 311.

The GPS receiving module 312 receives the coordinates of the terminal 310 from the GPS satellite 330, and provides the received coordinates to the controller 311. The CDMA module 314 receives information about the base station within the CDMA2000 network accessed by the terminal, and provides the base station information to the controller 311. The base station information may be represented by CDMA2000 cell information, since the CDMA2000 cells are designed using the base stations and sectors for each base station.

The controller 311 transmits the terminal coordinates and the base station (CDMA2000 cell) information, which are received from the GPS receiving module 312 and the CDMA module 314, respectively, to the cell mapping server 300 via the WLAN module 313. The controller 311 receives the information about the cell to which the terminal is expected to be handed off from the cell mapping server 300, and stores the information about the cell to which the terminal is expected to be handed off in the storage unit 315. The information about the cell to which the terminal is expected to be handed off, stored in the storage unit 315, varies as the terminal 310 moves.

The WLAN module 313 relays between the cell mapping server 300 and the controller 311 through a wireless connection to the access point within the WLAN, and performs WLAN handoff using the information about the cell to which the terminal is expected to be handed off as determined by the controller 311.

Figure 5:
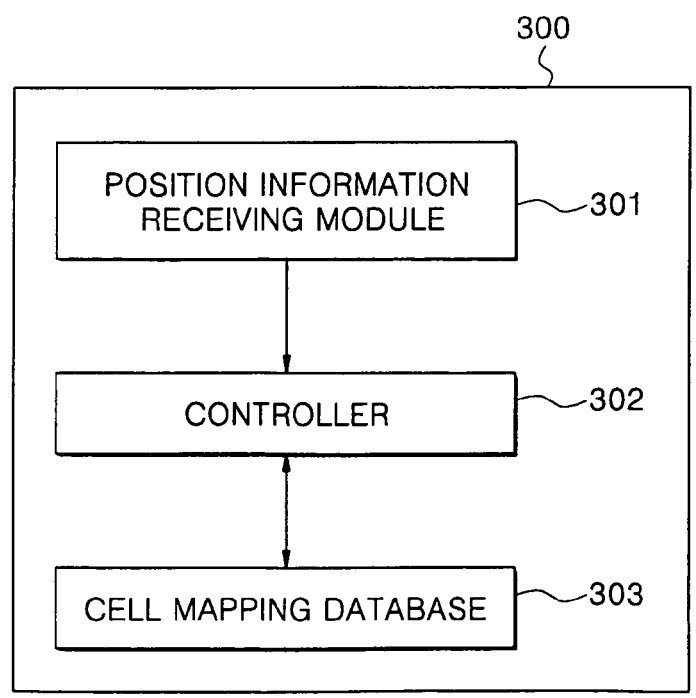
FIG. 5 is a block diagram of a cell mapping server according to an exemplary embodiment of the present invention.

FIG. 5 is a block diagram of a cell mapping server according to an exemplary embodiment of the present invention.

Referring to FIG. 5, the cell mapping server 300 includes a position information receiving module 301, a controller 302, and a cell mapping database 303.

The cell mapping database 303 stores CDMA2000 cell information, WLAN cell information, and information for mapping between a CDMA200 cell and a WLAN cell. The mapping information may be managed in the form of a list. The structure of the cell mapping database 303 will be described in detail below with reference to FIG. 7.

The position information receiving module 301 receives terminal position information from the terminal 310 via an access point. The position information includes the GPS coordinates of the terminal 310, and information about a CDMA cell where the terminal 310 is located.

The controller 302 receives the position information of the terminal 310 via the position information receiving module 301, and determines information indicating which of WLAN cells the terminal 310 will move to (i.e., the information about the cell to which the terminal is expected to be handed off, based on the position information and the mapping information stored in the cell mapping database 303). The determined information about the cell to which the terminal is expected to be handed off is returned to the terminal 310, and is used in the handoff process.

Figure 6:
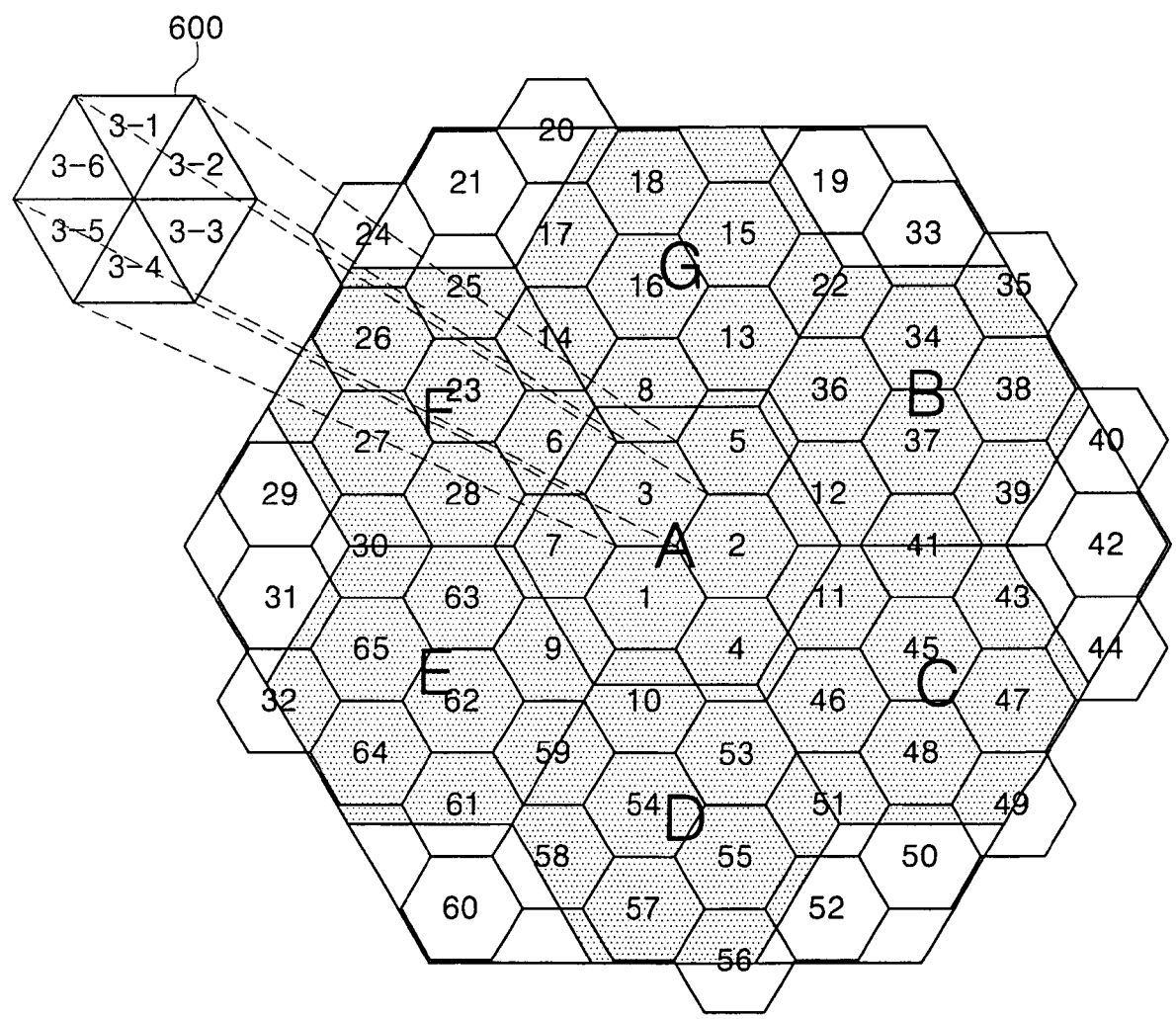
FIG. 6 illustrates a structure in which CDMA2000 cells overlap WLAN cells according to an exemplary embodiment of the present invention.

FIG. 6 illustrates a structure in which CDMA2000 cells overlap WLAN cells according to an exemplary embodiment of the present invention.

Smaller hexagonal cells, denoted by numerals 1 to 65, indicate WLAN cells, i.e., coverage areas of access points. Larger cells, denoted by A, B, C, D, E, F, and G, indicate CDMA2000 cells, i.e., coverage areas of base stations.

As shown in FIG. 6, the cells constituting two networks overlap one another. The cells only spatially overlap one another, and are non-interfering distinct cells since communication systems, bandwidths, etc. differ between the networks.

The present invention uses the spatially overlapping independent cells in the handoff process of the WLAN terminal.

One WLAN cell 600 is partitioned into six sub-cells 3-1 thru 3-6. This is for detecting a cell to which a terminal is expected to be handed off.

Figure 7:
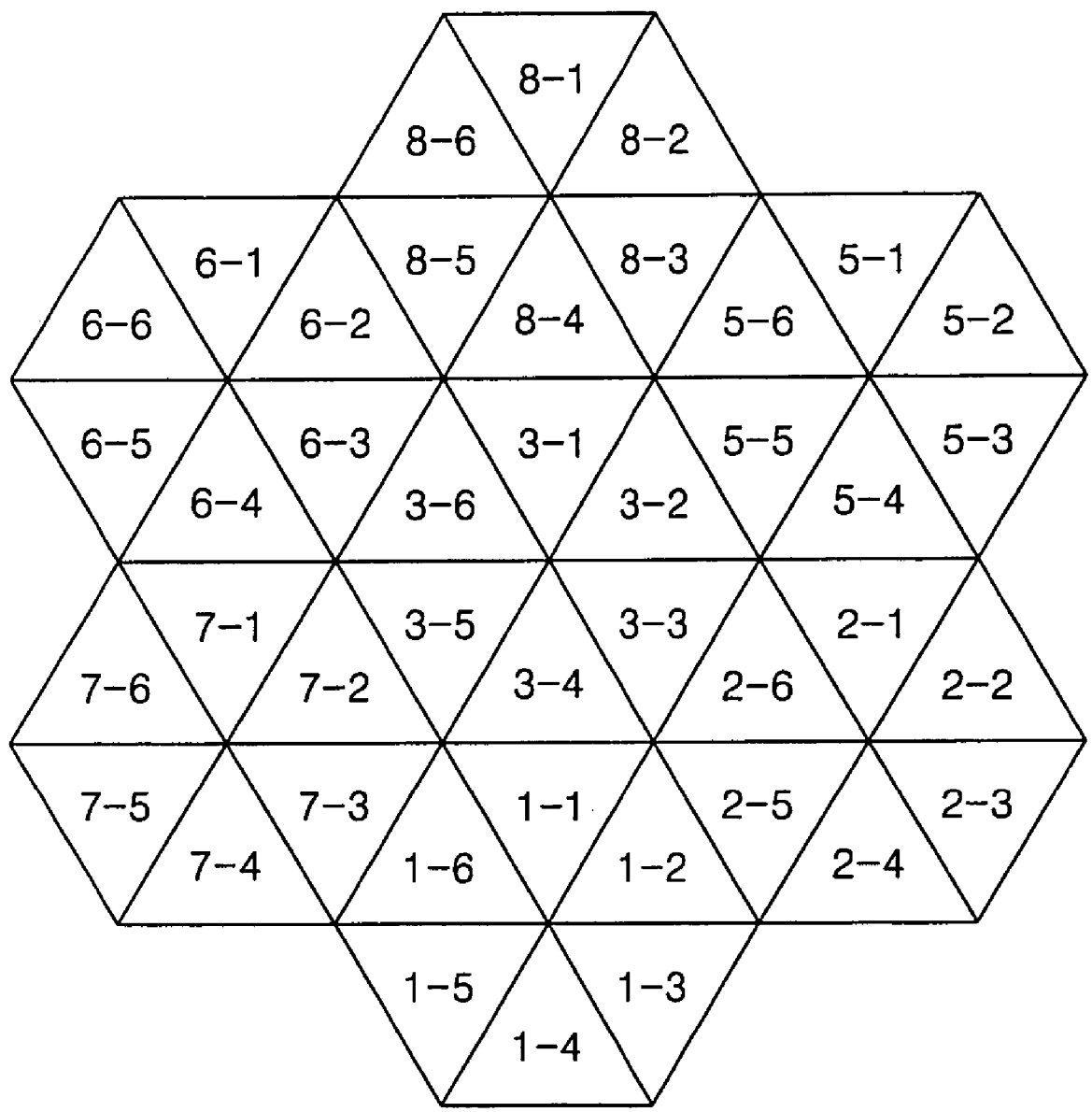
FIG. 7 illustrates the structure of sub-cells in a WLAN according to an exemplary embodiment of the present invention.

FIG. 7 illustrates the structure of sub-cells in a WLAN according to an exemplary embodiment of the present invention.

In the present invention, a WLAN cell is partitioned into six logical sub-cells around an access point. Referring to FIG. 7, seven access points constitute seven cells, each cell being partitioned into six sub-cells.

For example, a WLAN cell 3 is partitioned into sub-cells 3-1, 3-2, 3-3, 3-4, 3-5 and 3-6. This partition is for assigning a correct destination access point to a terminal upon handoff. A sub-cell where the terminal is located can be determined by scanning a spatially overlapping WLAN cell based on the terminal coordinates provided by the GPS satellite 330 and the CDMA cell information provided by the base station 320.

Handoff in the WLAN occurs when a terminal moves to another access point, e.g., when a terminal moves from sub-cell 3-5 to sub-cell 7-2, when a terminal moves from sub-cell 3-3 to sub-cell 2-6, etc. However, when a terminal moves from sub-cell 3-3 to sub-cell 3-4, no handoff occurs. This is because the access point before handoff is the same as the access point after handoff.

In the cell structure of FIG. 7, handoff at each sub-cell is allowed to occur with respect to only one new sub-cell. While a terminal may move to another area along a boundary between sub-cells, such a case is not considered because it is rare. For example, handoff at sub-cell 3-1 is allowed only to sub-cell 8-4, and a handoff destination access point is an access point corresponding to the cell 8. Furthermore, handoff at sub-cell 3-2 is allowed only to sub-cell 5-5, and a destination access point is an access point corresponding to the cell 5.

While the WLAN cells and the sub-cells have a hexagonal shape in the exemplary embodiment illustrated in FIG. 7, the present invention is not limited to the hexagonal cells and sub-cells, and the cells and the sub-cells may have a triangular shape if there are a limited number of other neighboring cells.

FIG. 8 illustrates the structure of a cell mapping database according to an exemplary embodiment of the present invention.

As shown in FIG. 8, the cell mapping database includes the CDMA2000 cell information, the WLAN cell information, and the information for mapping between the CDMA200 cell and the WLAN cell. The cell mapping database may have a list structure, as shown in FIG. 8.

Referring to FIG. 8, the cell mapping database stores a list of all cells in the CDMA2000 network, which is utilized in the present invention, and a list of WLAN cells that spatially overlap with the respective CDMA2000 cells. For example, a CDMA cell A overlaps WLAN cells 1 to 12, and a CDMA cell B spatially overlaps WLAN cells 5, 12, 22, 33, 34, 35, 36, 37, 38, 39 and 41.

The cell mapping database also includes a list of all WLAN cells and a list of sub-cells of the WLAN cells. While not shown in FIG. 8, a list mapping GPS coordinates of a coverage area of each WLAN cell to the WLAN cell may be further included in the cell mapping database 303.

A WLAN cell where the terminal is located can be determined based on the above-stated lists.

For example, based on the information about a CDMA cell where the terminal is located, a WLAN cell overlapping the CDMA cell is determined. The GPS coordinates of the determined WLAN cell are then compared to the GPS coordinates of the terminal, so that the WLAN cell where the terminal is currently located is easily determined. This should be understood only as one exemplary embodiment, and other methods may be used. Once the WLAN cell where the terminal is currently located is determined, a sub-cell to which the terminal is expected to be handed off can be determined by referring to the handoff mapping list.

Importantly, the cell mapping database provides a handoff mapping list. The handoff mapping list provides a sub-cell to which the terminal is expected to be handed off, corresponding to the WLAN sub-cell. Referring to FIG. 8, the sub-cell to which the terminal is expected to be handed off is mapped to a WLAN sub-cell where the terminal is currently located. The terminal is expected to be handed off to the new determined access point.

Figure 9:
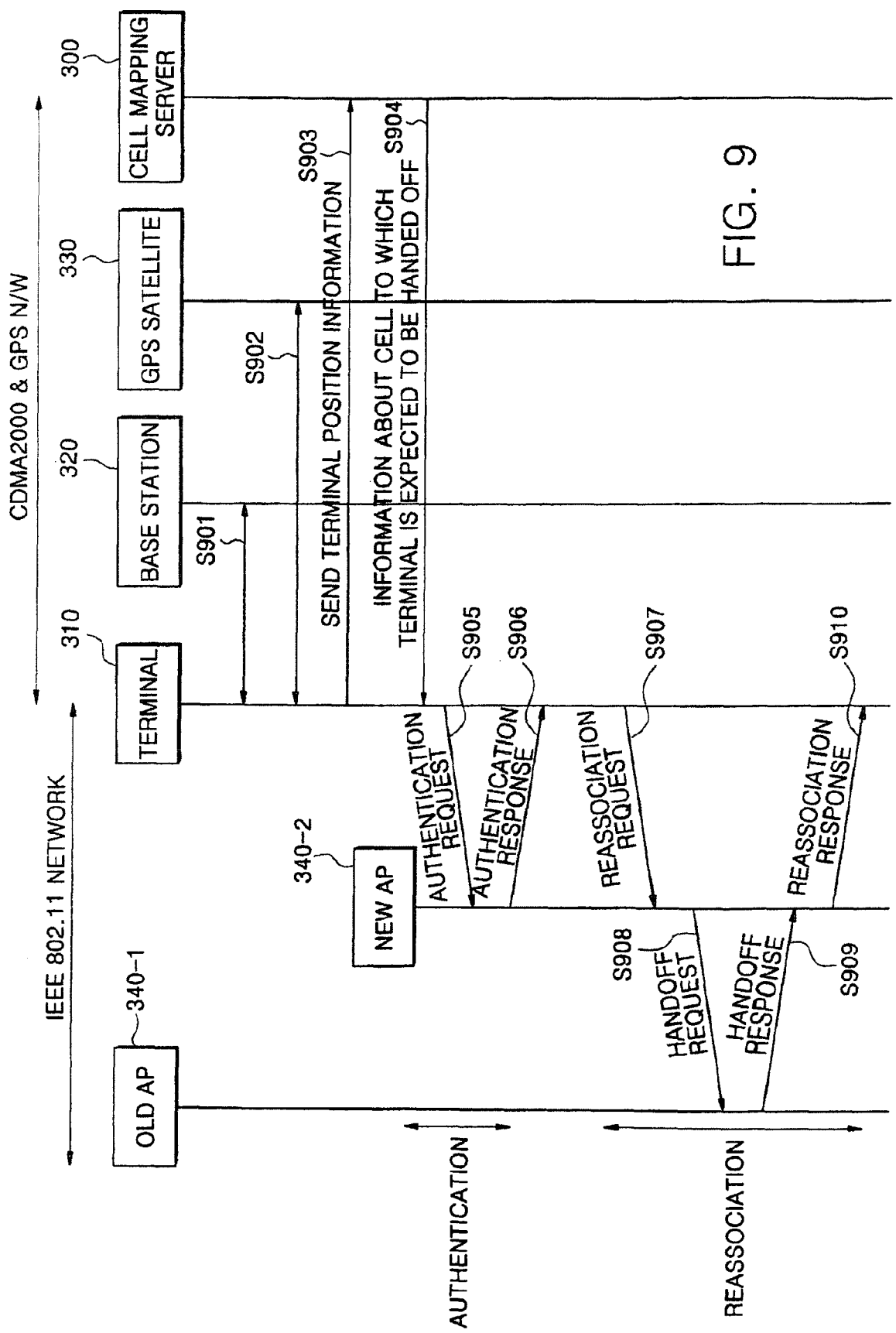
FIG. 9 illustrates flow of a handoff process in an overall network upon movement of a terminal according to an exemplary embodiment of the present invention.

FIG. 9 illustrates flow of a handoff process in an overall network upon movement of a terminal according to an exemplary embodiment of the present invention.

The mobile terminal 310 communicates with the base station 320 and the GPS satellite 330 so as to scan a new AP while communicating over the WLAN. The mobile terminal 310 determines the position of the terminal within the CDMA network cell through communication with the base station 320 (S901), and determines the position of the terminal, which is indicated by coordinates, through communication with the GPS satellite 330 (S902). The terminal 310 provides the determined terminal position information (information about a CDMA base station accessed by the terminal and the coordinates of the terminal) to the cell mapping server 300 (903). Upon receipt of the position information, the cell mapping server 300 determines information about a cell to which the terminal is handed off from the current position based on the terminal position information and the cell mapping database 303, and transmits the cell information to the terminal 310 (S904).

Subsequent to the scanning process, an authentication process is performed. The terminal 310 sends a request for authentication to the new AP 340-2 (S905). In response to the request, the new AP 340-2 determines whether the terminal 310 has permission to access the network, and returns an authentication response to the terminal 310 (S906).

The authenticated terminal 310 sends a re-association request to the new AP 340-2 (S907). The new AP 340-2 sends a handoff request to the old AP 340-1 (S908). In response to the handoff request, the old AP 340-1 provides a handoff response to the new AP 340-2, the handoff response including information needed for the re-association (S909). In response to the handoff response, the new AP 340-2 sends a re-association response to the terminal 310 (S910).

It can be seen from a comparison between the procedures of FIGS. 9 and 2 that there is a significant difference in the scanning process between the two procedures. Especially, in the procedure of FIG. 9, the terminal does not communicate with the access point in the channel scanning process. That is, the process of scanning a new access point for a handoff uses the CDMA network and the GPS service.

Figure 10:
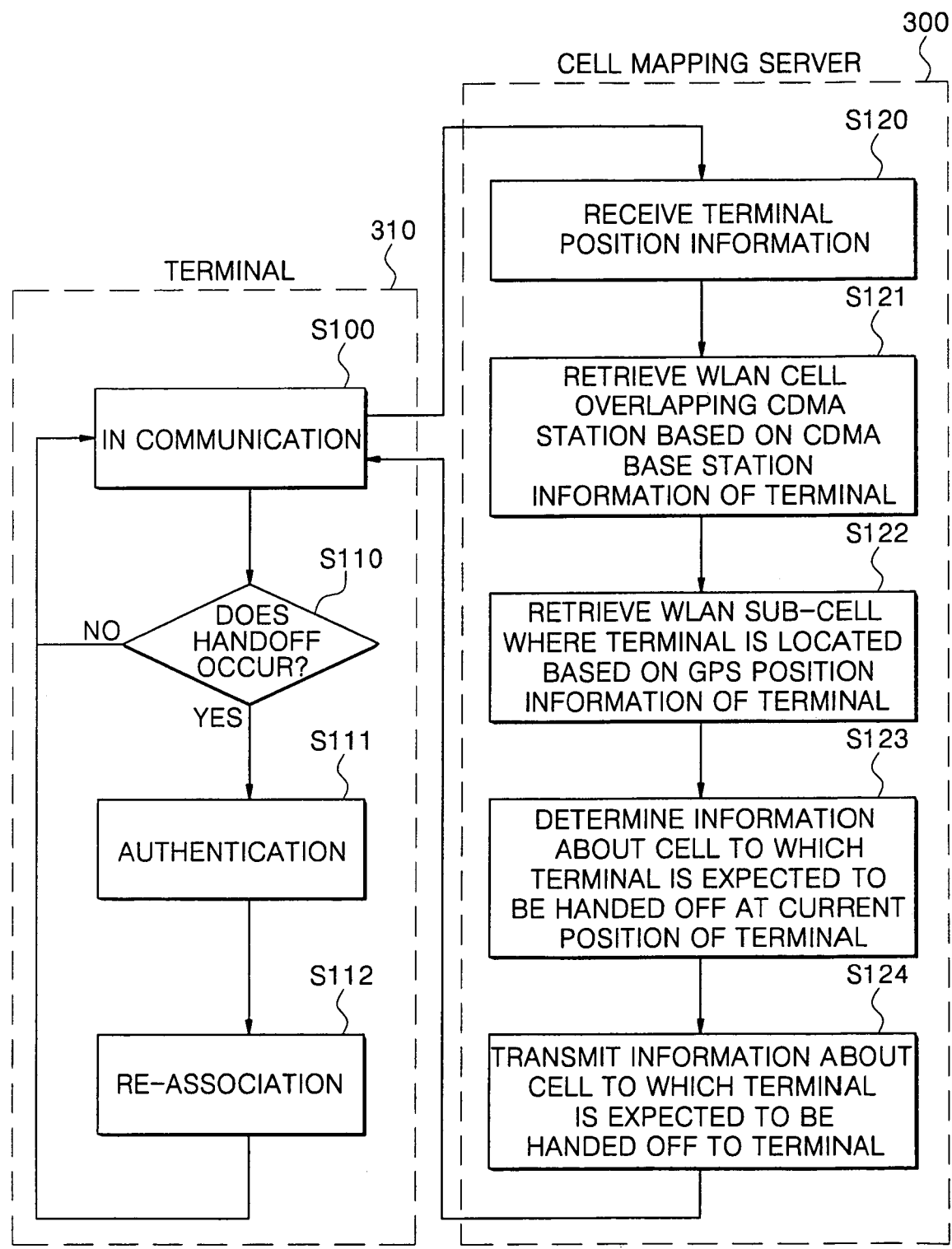
FIG. 10 illustrates flow of a handoff process between a terminal and a cell mapping server according to an exemplary embodiment of the present invention.

FIG. 10 illustrates flow of a handoff process between a terminal and a cell mapping server according to an exemplary embodiment of the present invention.

Prior to performing handoff, the terminal 310 provides its position information to the cell mapping server 300 while communicating over the WLAN as to whether the terminal currently moves or not (S100). The position information includes the GPS coordinates of the terminal and the information about a CDMA cell where the terminal is located, as discussed above. The cell mapping server 300 receives the terminal position information from the terminal 310 (S120).

The cell mapping server 300 retrieves a WLAN cell overlapping the CDMA cell in the cell mapping database 303 based on the CDMA cell information (i.e., the information about a CDMA base station where the terminal is located), which is contained in the received terminal position information (S121). After the cell mapping server 300 determines the WLAN cell, it retrieves a WLAN sub-cell where the terminal is located based on the GPS position information (coordinate) of the terminal (S122). The cell mapping server 300 determines matched information about a cell to which a terminal is expected to be handed off from the information about the WLAN sub-cell where the terminal is currently located (S123), and transmits information about the cell to which the terminal is expected to be handed off to the terminal 310 (S124).

When handoff occurs (S110), the terminal 310, which receives the information about the cell to which the terminal is expected to be handed off, performs the handoff through an authentication process (S111) and the re-association process (S112) without scanning a new access point.

According to the present invention, it is possible to significantly reduce handoff time of a WLAN terminal by shortening a time-consuming channel scanning process in the handoff process, thereby improving quality of the WLAN.

While the present invention has been described with reference to exemplary embodiments thereof, it will be understood by those skilled in the art that various changes in form and detail may be made therein without departing from the scope of the present invention as defined by the following claims.

What is claimed is:

1. A system for handoff in a wireless local area network (WLAN) using code division multiple access (CDMA) information, the system comprising:
   a WLAN terminal which determines its own position information through communication with a CDMA base station and a global positioning system (GPS) satellite;
   a cell mapping server for obtaining information about a WLAN cell corresponding to an area where the WLAN terminal is located from the position information of the WLAN terminal, for determining cell information about a WLAN cell to which the WLAN terminal is expected to be handed off from the position information of the WLAN terminal, and for providing the cell information to the WLAN terminal; and
   an Access Point (AP) for executing handoff with the WLAN terminal without communicating with the WLAN terminal in a channel scanning process, wherein the position information comprises information about a CDMA base station corresponding to the area where the WLAN terminal is located; and wherein the WLAN terminal comprises:
- a CDMA module for receiving, from the CDMA base station, CDMA cell information about a CDMA cell accessed by the WLAN terminal; and
- a controller for transmitting the CDMA cell information to the cell mapping server.

2. The system according to claim 1, wherein the position information further comprises GPS coordinate information of the WLAN terminal.

3. The system according to claim 1, wherein the cell information about the WLAN cell to which the WLAN terminal is expected to be handed off comprises information about an access point that serves the WLAN cell to which the WLAN terminal is expected to be handed off.

4. The system according to claim 1, wherein the WLAN terminal further comprises:
- a GPS receiving module for receiving coordinate information of the WLAN terminal from the GPS satellite; and
- a storage unit for storing the cell information about the WLAN cell to which the WLAN terminal is expected to be handed off,
- wherein the controller transmits the coordinate information to the cell mapping server, receives, from the cell mapping server, the cell information about the WLAN cell to which the WLAN terminal is expected to be handed off, and stores the cell information about the WLAN cell to which the WLAN terminal is expected to be handed off, in the storage unit.

5. The system according to claim 4, wherein the WLAN terminal further comprises:
- a WLAN module for receiving, from the controller, the cell information about the WLAN cell to which the WLAN terminal is expected to be handed off and for performing the handoff based on the cell information.

6. The system according to claim 1, wherein the cell mapping server comprises:
- a cell mapping database for storing information about CDMA cells and WLAN cells mapped to the CDMA cells and for storing the cell information about the WLAN cell to which the WLAN terminal is expected to be handed off, the WLAN cell to which the WLAN terminal is to be handed off being mapped to a CDMA cell; and
- a cell mapping controller for determining the cell information about the WLAN cell to which the WLAN terminal is expected to be handed off based on the position information of the WLAN terminal and the mapping information stored in the cell mapping database, and for providing the cell information to the WLAN terminal.

7. The system according to claim 6, wherein the cell mapping controller obtains information about a WLAN cell overlapping a CDMA cell corresponding to the area where the WLAN terminal is located, compares the WLAN cell information to GPS position information of the WLAN cell to determine information about a WLAN sub-cell corresponding to the area where the WLAN terminal is located, and determines the cell information about the WLAN cell to which the WLAN terminal is expected to be handed off, which is associated with the WLAN sub-cell.

8. The system according to claim 6, wherein the cell mapping database stores at least one of information about an overall structure of CDMA cells, information about an overall structure of WLAN cells, and GPS coordinate information of the WLAN cells and sub-cells.

9. The system according to claim 6, wherein the cell mapping server further comprises a position information receiving module for receiving the position information from the WLAN terminal.

10. The system according to claim 1, wherein the WLAN terminal performs handoff based on the cell information about the WLAN cell to which the WLAN terminal is expected to be handed off, the cell information of the WLAN cell to which the WLAN terminal is to be handed off being received from the cell mapping server without scanning a destination access point.

11. The system according to claim 1, further comprising:
- a GPS satellite for transmitting GPS coordinate information to the WLAN terminal; and
- a CDMA base station system for transmitting CDMA cell information to the WLAN terminal.

12. A system for managing a code division multiple access (CDMA) network and a wireless local area network (WLAN), the system comprising:
- a cell mapping database for storing information about CDMA cells and WLAN cells, mapping information of the WLAN cells mapped to the CDMA cells, and cell information about a WLAN cell to which a terminal is expected to be handed off;
- a cell mapping controller for determining the cell information about the WLAN cell to which the terminal is expected to be handed off based on terminal position information comprising one of global positioning system (GPS) coordinate information of the terminal and information about a CDMA cell corresponding to an area where the terminal is located, and the mapping information stored in the cell mapping database, and for providing, to the terminal, the cell information about the WLAN cell to which the terminal is expected to be handed off; and
- an Access Point (AP) for executing handoff with the terminal without communicating with the terminal in a channel scanning process,
- wherein the cell information about the WLAN cell to which the terminal is expected to be handed off comprises information about an access point serving the WLAN cell to which the terminal is expected to be handed off, and
- wherein the terminal provides the position of the WLAN terminal within the CDMA cell and the coordinate information of the terminal to a cell mapping server.

13. The system according to claim 12, further comprising a position information receiving module for receiving, from the terminal, the one of the GPS coordinate information of the terminal and the information about the CDMA cell corresponding to the area where the terminal is located.

14. The system according to claim 12, wherein the cell mapping controller obtains information about a WLAN cell overlapping the CDMA cell corresponding to the area where the terminal is located, compares the WLAN cell information to GPS position information of the WLAN cell to determine information about a WLAN sub-cell corresponding to the area where the terminal is located, and determines the cell information about the WLAN cell to which the terminal is expected to be handed off, which is associated with the WLAN sub-cell.

15. The system according to claim 12, wherein the cell mapping database stores at least one of information about an overall structure of the CDMA cells, information about an overall structure of the WLAN cells, and GPS coordinate information of the WLAN cells and sub-cells.

16. A method for handoff in a wireless local area network (WLAN) using code division multiple access (CDMA) information, the method comprising:
- determining, by a WLAN terminal, a position of the WLAN terminal within a CDMA network cell through communication with a base station and a coordinate position of the WLAN terminal through communication with a global positioning system (GPS) satellite, the coordinate position of the WLAN terminal being indicated by coordinates;
- providing, by the WLAN terminal, the position of the WLAN terminal within the CDMA network cell and the coordinate position of the WLAN terminal to a cell mapping server;
- determining, by the cell mapping server, cell information about a WLAN cell to which the WLAN terminal is to be handed off based on the position of the WLAN terminal within the CDMA network cell, the coordinate position of the WLAN terminal, and a cell mapping database; and
- transmitting, by the cell mapping server, the cell information to the WLAN terminal.

17. The method according to claim 16, further comprising:
- sending, by the WLAN terminal, a request for authentication to a first Access Point (AP);
- in response to the request, checking, by the first AP, whether the WLAN terminal has permission to access a network connected to the first AP, and transmitting an authentication response to the WLAN terminal;
- sending, by the WLAN terminal, a re-association request to the first AP;
- sending, by the first AP, a handoff request to a second AP;
- providing, by the second AP, a handoff response to the first AP in response to the handoff request; and
- sending, by the first AP, a re-association response to the WLAN terminal in response to the handoff response,
- wherein the handoff response comprises information related to the re-association, and
- wherein the first AP is a destination AP to be handed off and the second AP is an AP connected to the WLAN terminal.

18. The method according to claim 16, wherein the cell information about the WLAN cell to which the WLAN terminal is to be handed off comprises information about an access point serving the WLAN cell to which the WLAN terminal is expected to be handed off.

19. The method according to claim 16, further comprising:
- storing, by the cell mapping server, the cell information about the WLAN cell to which the WLAN terminal is to be handed off, the cell information being provided to the WLAN terminal; and
- performing handoff based on the stored cell information without scanning a destination access point.

20. The method according to claim 16, wherein determining, by the cell mapping server, the cell information about the WLAN cell to which the WLAN terminal is to be handed off based on the position of the WLAN terminal within the CDMA network cell, the coordinate position of the WLAN terminal, and a cell mapping database further comprises:
- comparing the position of the WLAN terminal within the CDMA network cell to the coordinate position of the WLAN terminal.

21. The method according to claim 16, wherein determining, by the cell mapping server, the cell information about the WLAN cell to which the WLAN terminal is to be handed off based on the position of the WLAN terminal within the CDMA network cell, the coordinate position of the WLAN terminal, and a cell mapping database further comprises:
- retrieving information about a WLAN cell overlapping the CDMA cell corresponding to an area where the WLAN terminal is located;
- determining information about a WLAN sub-cell corresponding to the area where the WLAN terminal is located by comparing the retrieved WLAN cell information to the coordinate position of the WLAN terminal; and
- determining information about a neighboring cell matched to the retrieved WLAN sub-cell corresponding to the area where the WLAN terminal is located.

* * * * *